J. H. WILSON, Jr.
SAFETY HARNESS APPLIANCE.
No. 14,484.            Patented Mar. 18, 1856.
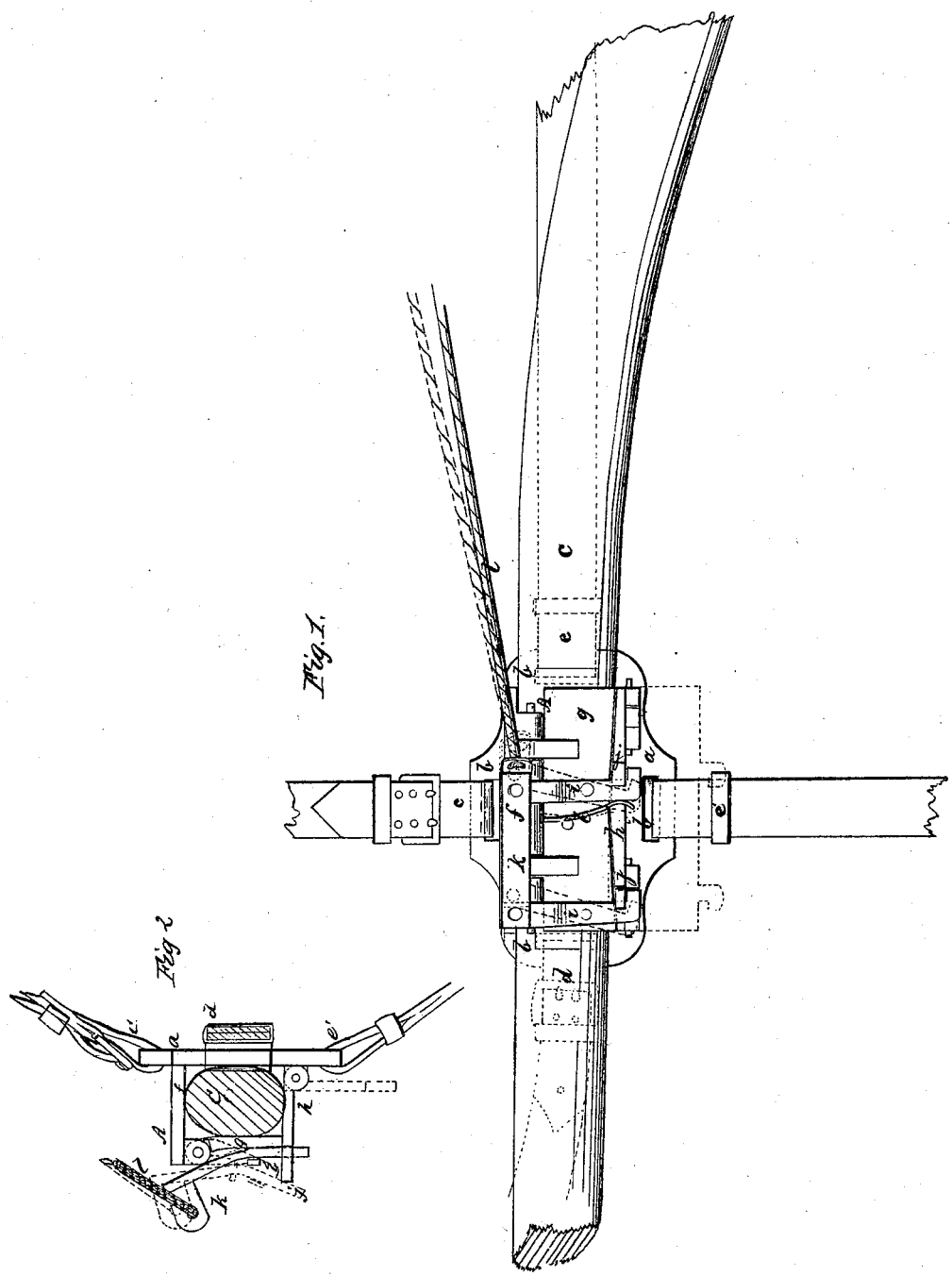

UNITED STATES PATENT OFFICE.

JAS. H. WILSON, JR., OF NASHVILLE, TENNESSEE.

SAFETY APPARATUS TO BE APPLIED TO HARNESSES AND THILLS OF VEHICLES.

Specification of Letters Patent No. 14,484, dated March 18, 1856.

*To all whom it may concern:*

Be it known that I, JAMES H. WILSON, Jr., of Nashville, in the county of Davidson and State of Tennessee, have invented a new and improved device to be applied to harnesses and the shafts of vehicles whereby a horse when necessity requires may be readily detached from the vehicle by the driver, and which device I term a "Safety harness appliance;" and I do hereby declare that the following is a full, clear, and exact description of the same, reference being had to the accompanying drawings, forming part of this specification, in which—

Figure 1, is a side view of my improvement. Fig. 2, is a transverse vertical section of ditto.

Similar letters of reference indicate corresponding parts in both figures.

This invention relates to a new and useful device to be applied to one horse harnesses and the shafts of vehicles, whereby the horse may, when necessity requires, be instantly detached from the vehicle.

To enable those skilled in the art to fully understand and construct my invention, I will proceed to describe it.

A, represents a metallic box of rectangular form, the back plate or sides $a$, of which is somewhat larger than the other three sides and has an aperture $b$ through it at each side of the box. These apertures are for the purpose of securing the boxes to the harness, there being a box at each side of the horse just behind his shoulders.

The saddle straps $c$, of the harness are secured in the upper aperture $b$, in the back plates or sides $a$, of the boxes. The hames straps $d$, are secured in the apertures at the front ends of the plates or sides $a$. The breech band $e$, is secured in the apertures at the back ends of the plates and the belly band $e'$, is secured in the apertures at the lower ends of the plates. The attachment of the boxes to the harness will be clearly understood by referring to Fig. 1.

The upper sides $f$, of the boxes A, are attached permanently to the back plates $a$, and may be cast or formed with them in one piece. The outer side pieces $g$, of the boxes are hinged or jointed to the outer ends of the upper side pieces $f$. The bottom pieces or sides $h$, are hinged or jointed to the back plates or sides $a$. To the outer surfaces of the side pieces $g$, of the boxes, there are attached two catches $i, i$, the lower ends of which catch under projecting lips or ears $j, j$, on the outer edges of the bottom pieces or sides $h$. The catches are pivoted to the side pieces $g$, and the upper ends of the catches are connected by a bar $k$. To the outer surface of each side piece $g$, there is attached a spring $l$. These springs bear against one of the catches on each side piece $g$, and keep the lower ends of the catches, underneath the lips or ears $j$, as shown clearly in Fig. 1.

The shafts C, of the vehicle pass through the boxes A, A, the lips or ears $j$, being freed from the catches $i, i$, so as to allow the side pieces $g$, and bottom pieces or sides $h$, to open. The boxes are then placed upon the shafts and when the bottom and side pieces $h, g$, are secured or connected together by the catches $i, i$, the boxes will bind tightly upon the shafts.

To the inner ends of the bars $k$, which connect the upper ends of the catches $i, i$, there are attached reins or cords $l$, which reach and are connected to the driver's seat. No traces are employed, the horse being connected directly to the shafts by means of the boxes A, and no backing straps are required, the vehicle being drawn and backed through the medium of the shafts, only.

In case of a horse becoming restive or unmanageable, or in case of his running away, the driver, by merely pulling the cords or reins $l$, will detach the catches $i, i$, on each box from the lips or ears $j, j$, on the bottom pieces $h$, of the boxes, and the bottom and side pieces of the boxes will swing open, thereby releasing the boxes from the shafts and causing the vehicle to be detached instantly from the horse.

The above invention is simple and economical and will prevent accidents caused by horses running away. The expense of the boxes is compensated for by the omission of parts of the harness now required, such as traces and tugs or back straps.

Having thus described my invention, what I claim as new and desire to secure by Letters Patent, is,

Attaching the horse directly to the shafts C, of one horse vehicles by means of the boxes A, A, which are secured to the harness as shown, a box at each side of the horse, the boxes being constructed, as shown, with two hinged or jointed sides, so that they may be opened when necessary by the driver, for the purpose specified.

JAMES H. WILSON, JR.

Witnesses:
ROBT. N. BLACK,
R. W. ESTHER.